United States Patent [19]
Weltmer, Jr. et al.

[11] Patent Number: 5,005,362
[45] Date of Patent: Apr. 9, 1991

[54] CRYOGENIC STORAGE CONTAINER

[75] Inventors: William R. Weltmer, Jr., Murray Hill; Walter H. Whitlock, Peapack, both of N.J.

[73] Assignee: The BOC Group, Inc., Murray Hill, N.J.

[21] Appl. No.: 497,156

[22] Filed: Mar. 20, 1990

[51] Int. Cl.⁵ .............................................. F17C 1/00
[52] U.S. Cl. ...................................... 62/45.1; 62/46.3
[58] Field of Search ................................ 62/45.1, 46.3

[56] References Cited

U.S. PATENT DOCUMENTS

| | | | |
|---|---|---|---|
| 3,699,696 | 10/1972 | Rhoton | 62/45.1 |
| 3,762,175 | 10/1973 | Jones | 62/45.1 |
| 3,768,765 | 10/1973 | Breckenridge, Jr. | 62/45.1 |
| 3,967,465 | 7/1976 | Asselman et al. | 62/46.3 |

*Primary Examiner*—Ronald C. Capossela
*Attorney, Agent, or Firm*—Robert I. Pearlman; David M. Rosenblum

[57] ABSTRACT

The present invention provides a cryogenic storage container having a pressure vessel surrounded by a vacuum vessel for maintaining a vacuum between the outer wall of the vacuum vessel and the pressure vessel. A pair of intermediate and sub-intermediate heat shields are disposed between the outer wall of the vacuum vessel and the pressure vessel for intercepting the heat that would otherwise be transferred from the vacuum vessel to the pressure vessel. The heat intercepted by the intermediate heat shield is absorbed by liquid nitrogen contained within a liquid nitrogen container. The heat intercepted by the sub-intermediate heat shield is preferably absorbed by liquid neon in a liquid neon storage tank. The liquid nitrogen and neon absorb heat by undergoing a phase change, from liquid to vapor. In order to prevent failure of the liquid nitrogen container, the nitrogen is vented to the atmosphere over a period of time. The vaporized neon, on the other hand, flows into an adsorbant canister containing activated charcoal to adsorb gaseous neon for regeneration back to liquid neon at a future time.

6 Claims, 1 Drawing Sheet

CRYOGENIC STORAGE CONTAINER

BACKGROUND OF THE INVENTION

The present invention relates to a cyrogenic storage container for storing helium, hydrogen, or neon. Typically, such cryogenic storage containers are used for shipping cryogens by sea transport for a journey that may extend anywhere from a month to forty days. As is well known in the art, heat transfer from the ambient to the liquid cryogen causes the liquid cryogen to boil off into a gaseous state. A point of time in some long journeys is reached at which the pressure of the cryogen exceeds the pressure rating of the cryogenic storage container., and thus, some of the cryogen is vented prior to reaching its destination. This results in loss of product and therefore adds to the expenses involved in the shipment of the cryogen. This is particularly true when liquid helium is to be transported. Additionally, when liquid hydrogen is transported, the venting of the hydrogen presents a danger due to its flammability.

Prior art cryogenic storage containers are designed to extend the point in time at which the cryogenic vapor must be vented for as long as possible. In one type of cryogenic storage container design, a pressure vessel is provided for containing the liquid cryogen. A vacuum vessel having an outer wall surrounding and spaced from the pressure vessel is provided for subjecting the space between the outer wall and the pressure vessel to a vacuum so that heat transfer by conduction is reduced. An inlet line communicates with the pressure vessel for filling the pressure vessel with the liquid cryogen and a vent line is also provided in communication with the pressure vessel for venting the boil-off vapor from the pressure vessel. An intermediate heat shield, provided between the pressure vessel and the vacuum vessel outer wall, is formed from a conductive material for intercepting the heat flow that would otherwise be transferred from the outer wall of the vacuum vessel to the pressure vessel. A pair of first and second insulation layers are provided between the heat shield and the vacuum vessel outer wall and the pressure vessel, respectively. Lastly, a liquid nitrogen container, containing liquid nitrogen, is provided in thermal contact with the intermediate heat shield for absorbing the intercepted heat by vaporization of the liquid nitrogen. This absorption of heat decreases the thermal load on the pressure vessel. A point is reached at which the vapor pressure of the nitrogen is greater than the rated pressure of the liquid nitrogen container and therefore, a vent line is provided to vent the nitrogen vapor. However, since the thermal loading on the pressure vessel is reduced, the contents of the pressure vessel can be stored for a longer time before having to be vented.

As will be discussed hereinafter, the present invention provides a cryogenic storage container for storing either hydrogen, helium, or neon in which the storage time is further enhanced over the container design discussed above.

SUMMARY OF THE INVENTION

The present invention provides a cryogenic storage container for storing a liquid cryogen formed of one of hydrogen, helium, and neon. The cryogenic storage container includes a pressure vessel for containing the liquid cryogen and a vacuum vessel having an outer wall surrounding and spaced from the pressure vessel for subjecting the space between the outer wall and the pressure vessel to a vacuum. A pair of inlet and vent lines penetrate the vacuum vessel and communicate with the pressure vessel for filling the pressure vessel with the liquid cryogen and for venting boil-off vapor from the cryogen, respectively. An intermediate heat shield is spaced between the outer wall of the vacuum vessel and the pressure vessel for intercepting heat which would otherwise be transferred from the vacuum vessel to the pressure vessel. A pair of first and second layers of insulating material are located between the intermediate heat shield and the outer wall of the vacuum vessel and the pressure vessel, respectively. A liquid nitrogen container, formed of a heat conductive material and in thermal contact with the intermediate heat shield, is provided to contain liquid nitrogen. The liquid nitrogen absorbs the heat intercepted by the intermediate heat shield through vaporization of the liquid nitrogen.

In accordance with the present invention, a sub-intermediate heat shield is interposed between the second layer of insulating material and the pressure vessel and a third layer of insulation is located between the sub-intermediate heat shield and the pressure vessel. The sub-intermediate heat shield intercepts heat that would otherwise be transferred from the intermediate heat shield to the pressure vessel. Intermediate heat absorption means in thermal contact with the sub-intermediate heat shield and containing a coolant is provided for absorbing the heat intercepted by the sub-intermediate heat shield by undergoing a phase change. In this regard, the phase transition temperature of the coolant, at which such phase change occurs, is below the boiling temperature of liquid nitrogen. Thus, the portion of radiated heat not absorbed by the liquid nitrogen is absorbed by the intermediate heat absorption means to further lessen the thermal loading on the pressure vessel. The coolant of the intermediate heat absorption means preferably comprises liquid neon which is vaporized to absorb the intercepted heat. Such coolant may also comprise helium or hydrogen. Since helium and neon are expensive and hydrogen is flammable, it is necessary to recover as much of the coolant of the intermediate heat absorption means after having undergone the phase change as is practical. Therefore, recovery means connected to the intermediate heat absorption means are also provided for recovering the coolant after having undergone the phase change for regeneration of the coolant.

BRIEF DESCRIPTION OF THE DRAWINGS

While the specification concludes with claims particularly pointing out the subject matter that applicants regard as their invention, it is believed that the invention will be better understood from the following description taken in conjunction with the accompanying drawings in which:

DETAILED DESCRIPTION

Figure 1:
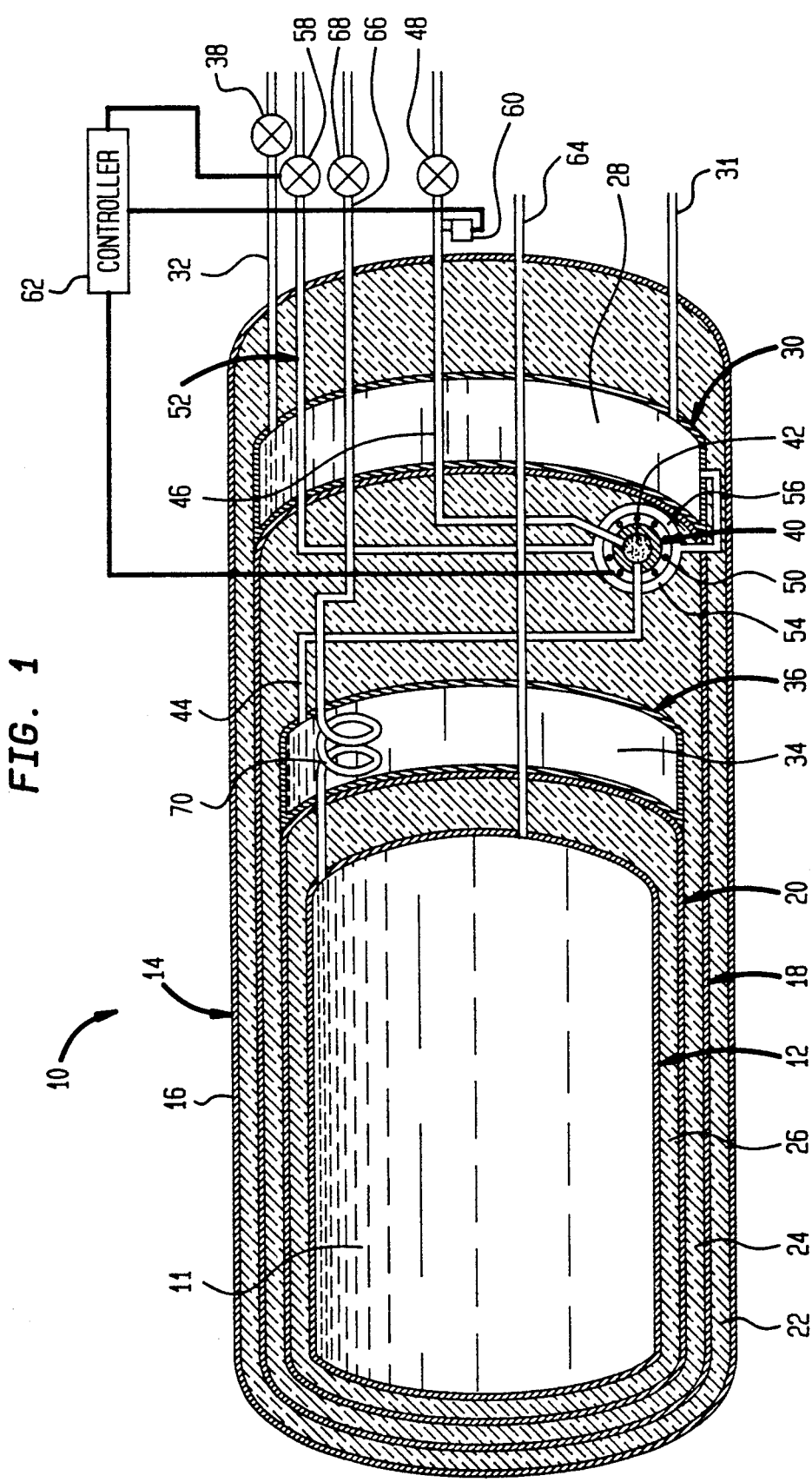
FIG. 1, is a schematic cross-sectional view of a cryogen storage container in accordance with the present invention.

With reference to FIG. 1, a preferred embodiment of a cryogen storage container 10 in accordance with the present invention is illustrated. Cryogen storage container 10 is designed to store hydrogen, helium, or neon, designated by reference numeral 11, within a cylindrical pressure vessel 12. Pressure vessel 12 is located within a cylindrical vacuum vessel 14 having an outer wall 16 surrounding and spaced from pressure vessel 12. The space between pressure vessel 12 and outer wall 16 of vacuum vessel 14 is evacuated. After evacuation, heat transfer by conduction is reduced so that predominately heat is transferred from outer wall 16 of vacuum vessel 14 to pressure vessel 12 by radiation.

An intermediate heat shield 1B, also of cylindrical configuration and spaced between outer wall 16 of vacuum vessel 14 and pressure vessel 12, is provided for intercepting heat transmitted from vacuum vessel 14 to pressure vessel 12. A cylindrical sub-intermediate heat shield 20 is interposed between intermediate heat shield 18 and pressure vessel 12 so as to surround pressure vessel 12 and to be spaced between intermediate heat shield 18 and pressure vessel 12. Both intermediate heat shield 18 and sub-intermediate heat shield 20 are formed from a high thermal conductivity material, such as aluminum or wrapped aluminum strips. A portion of the heat that would otherwise be transferred from outer wall 16 of vacuum vessel 14 to pressure vessel 12 is intercepted by intermediate heat shield 18 and another portion of the heat that would otherwise be transferred from intermediate heat shield 18 to vacuum vessel 14 is intercepted by sub-intermediate heat shield 20. It should be mentioned that there exists a degree of conductive heat transfer within vacuum vessel 14 due to penetrating inlet and vent piping, which will be discussed hereinafter, and structural supports, which although not illustrated may be provided to support intermediate and sub-intermediate heat shields 18 and 20 between pressure vessel 12 and vacuum vessel 14. As may be appreciated, intermediate and sub-intermediate heat shields 18 and 20 intercept such conducted heat as well.

A set of first, second and third insulative layers 22, 24 and 26 are provided to insulate intermediate heat shield 18 from outer wall 14 of vacuum vessel 16, intermediate heat shield 18 from sub-intermediate heat shield 20, and sub-intermediate heat shield 20 from vacuum vessel 12. First, second and third insulative layers 22-24 may each be formed of multiple layers of MYLAR coated with reflective aluminum in a manner well known in the art.

The heat intercepted by intermediate heat shield 18 is absorbed by a quantity of liquid nitrogen 28 contained within a liquid nitrogen container 30, preferably fabricated from aluminum, and also in thermal contact with intermediate heat shield 18. An inlet line 31 and a vent line 32, penetrating outer wall 16 of vacuum vessel 14 and communicating with the interior of liquid nitrogen container 30, are provided for filling liquid nitrogen container 30 and for venting nitrogen vapor from liquid nitrogen container 30, respectively.

The heat intercepted by sub-intermediate heat shield 20 is absorbed in a coolant 34 contained within a coolant tank 36, also preferably fabricated from aluminum and in thermal contact with sub-intermediate heat shield 20. Coolant 34 preferably comprises neon. It may also comprise any material that is capable of absorbing heat by undergoing a phase change and having a transition temperature, at which the phase change occurs, lower than the boiling point of liquid nitrogen. Other possible materials therefore include hydrogen or helium. For purposes that will become apparent, liquid neon is a particularly preferred material.

Although the preferred embodiment contemplates coolant 34 undergoing a phase change from a liquid phase to a vapor phase, it may be appreciated that depending on the extent to which coolant 34 were initially cooled, the phase change could be solid to liquid or solid to vapor or solid to liquid and then to vapor.

As the time in which the material contained within pressure vessel 12 increases, liquid nitrogen 28 will begin to vaporize to an extent that an overpressure is produced within liquid nitrogen container 30 that must be relieved so as to prevent failure of liquid nitrogen container 30. For this reason, a valve 38 in a manner well known in the art is provided in vent line 32. Additionally, an overpressure within coolant tank 36 will be produced by the vaporization of coolant 34 that will result in an overpressure within coolant tank 36. To this end, a spherical adsorbant canister 40 is provided within second insulation layer 24, between liquid nitrogen container 30 and coolant tank 36. Adsorbant canister 40 contains activated charcoal, designated by reference numeral 42, and is connected to coolant tank 36 by a relief line 44. It is understood that other adsorbants such a molecular sieve material could function in much the same manner as the preferred activated charcoal adsorbant described herein. Relief line 44 preferably penetrates the top of coolant tank 36; and adsorbent canister 40 is preferably located near the bottom of liquid nitrogen container 30 and intermediate heat shield 18. Activated charcoal 42 adsorbs the vaporized neon and, as will be discussed, may be regenerated to release the neon for reliquefaction at a future time. An adsorbent canister vent line 46 is provided to vent vaporized neon not adsorbed by activated charcoal 42. Venting of neon through adsorbent canister vent line 46 is controlled by a pressure relief valve 48 set to open at the pressure rating of adsorbent canister 40.

Activated charcoal 42 is most capable of adsorbing vaporized neon at temperatures less than about 80° Kelvin and is incapable of any significant adsorption of vaporized neon at room temperature. In fact, at room temperature any neon adsorbed by activated charcoal 42 will deadsorb. Thus, in the present invention, activated charcoal 42 is cooled to adsorb neon vapor and is heated to prevent adsorption of neon vapor and to release neon from adsorbant 42 during regeneration. For instance, during a long journey, activated charcoal 42 is cooled to adsorb the neon vapor; and after the journey, activated charcoal 42 is heated in the regeneration of neon back to its function as a coolant. Moreover, during the initial filling of coolant tank 36, activated charcoal 42 is heated to prevent it from becoming loaded with neon by adsorption of neon vapor. In accordance with the present invention, adsorbent canister 40 is blanketed by heating elements 50 in a manner well known in the art to heat activated charcoal 42; and activated charcoal 42 is cooled with liquid nitrogen 28 vented through a coolant outlet line 52 having branches 54 and 56 surrounding adsorbent canister 40.

In regard to the cooling of activated charcoal 42, when the pressure of vaporized neon is about 5 psig, a solenoid activated valve 58 in coolant outlet line 52 opens to circulate liquid nitrogen around adsorbent canister 40. The pressure within adsorbent canister 40 is sensed by a pressure sensor 60 located within adsorbent canister vent line 46. Pressure sensor 60 is connected to a controller 62, well known in the art, which is in turn connected to solenoid activated valve 58 to control its operation.

Pressure vessel 12 is provided with an inlet line 64 and a vent line 66 having a pressure relief valve 68. As illustrated, vent line 66 is provided with a coiled section 70 or a finned tube located within coolant tank 36. In refilling cryogen storage container 10, liquid hydrogen, helium, or neon is circulated through inlet line 64 and pressure vessel 12 and then out of vent line 66 and coil 70 to cool the vaporized neon and thus, reliquify the neon. The outgoing hydrogen, helium, or neon flows out of vent line 66 to a liquefaction system and back to inlet line 64 until coolant tank 36 is completely filled with reliquified neon. In the regeneration of the neon back to its liquid phase, controller 62 is set to control heating elements 50 for activation at about 5 psig pressure within adsorbent canister 40. In this regard, heating elements 50 may have a power output of above about 500 watts. The actual power output is not critical in as much as the length of time that heating elements 50 are activated is a function of the pressure within canister 40. Thus, the lower the output rating, the longer that activated charcoal would have to be heated during regeneration of the neon coolant. Additionally, although heating elements 50 are illustrated as blanketing adsorbant canister 40, they could be fabricated in a manner well known in the art to project into adsorbant canister 40. Lastly, as could be appreciated by those skilled in the art, a temperature sensor connected to controller 62 could be provided in order to prevent activated charcoal 42 from overheating.

Coolant tank 36 may be filled through adsorbent canister vent line 46. Although not illustrated, a separate valved branch could be provided in adsorbant canister vent line 46 for such purpose. In the filling stage, it is necessary that vaporized neon not be adsorbed in activated charcoal 42. In order to prevent the adsorption of vaporized neon, heating elements 50 are switched on to heat adsorbent canister 40 and activated charcoal 42. The activation of heating elements 50 is controlled by controller 62 which turns on heating elements 50 when the pressure within adsorbent canister 42 is about 5 psig as sensed by pressure sensor 60.

Cryogenic storage container 10 is designed to use conventional components such as found in Model number: GC D11OOO LHE TC 6404 N, manufactured by Gardner Cryogenics of 2136 City Line Road, Bethlehem, Pa; for instance, a pressure vessel 12 having a capacity of about 41,635 liters and a liquid nitrogen container 30 having a capacity of about 1,238 liters. As may be appreciated, vacuum vessel 14 is somewhat lengthened to accommodate sub-intermediate heat shield 20, third layer of insulation 26 and coolant tank 36. Other embodiments of the present invention may be constructed in accordance with the amount of liquid cryogen to be stored. In this regard, the amount of coolant 34, the size of coolant tank 36, the amount of activated charcoal 42 and thus, the size of adsorbant canister 40 in any embodiment will vary in accordance with the amount of liquid cryogen to be stored and the designed reduction in heat leak to substance 11. In the preferred embodiment, constructed as described herein, coolant tank 36 is fabricated to contain about 220 Kg of neon and adsorbant canister 40 is fabricated to contain about 609 liters of activated charcoal 42. The storage time before which the liquid cryogen contained in such cryogenic storage container would be vented would be about 60 days. This is to be contrasted with the conventional cryogenic storage container in which the same amount of liquid cryogen would have to be vented in about 30 days.

It should be noted that if hydrogen were used as the coolant 34, an adsorbant canister would be likely placed outside of vacuum vessel 14 with a line communicating between such adsorbant canister and coolant tank 36. In the case of hydrogen, the adsorbant would be powdered nickel, titanium, or lanthanum or other substances capable of forming hydrides which would be heated to recover the hydrogen. As an alternative to the use of an adsorbant, any heat absorbing, phase transitioning coolant utilized might be piped out of vacuum vessel 14 to a compressor which would compress the coolant for storage and subsequent reliquefaction at a future time.

Another point that should be mentioned is that although the present invention has been discussed relative to a cryogenic storage container used in the transport of hydrogen, helium or neon, the present invention has equal application to permanently located storage facilities.

Although preferred embodiments have been shown and described in detail, it will be readily understood and appreciated by those skilled in the art, that numerous omissions, changes and additions may be made without departing from the spirit and scope of the invention.

We claim:

1. In a cryogen storage container for storing a liquid cryogen formed of one of hydrogen, helium, and neon wherein the cryogenic storage container comprises: a pressure vessel for containing the liquid cryogen; a vacuum vessel having an outer wall surrounding and spaced from the pressure vessel for subjecting the space between the outer wall and the pressure vessel to a vacuum; a pair of inlet and vent lines penetrating the vacuum vessel and in communication with the pressure vessel for filling the pressure vessel with the liquid cryogen and for venting boil-off vapor from the liquid cryogen, respectively; an intermediate heat shield spaced between the outer wall of the vacuum vessel and the pressure vessel for intercepting heat that would otherwise be transferred from the vacuum vessel to the pressure vessel; a set of first and second layers of insulating material located between the intermediate heat shield and the outer wall of the vacuum vessel and the pressure vessel, respectively., and a liquid nitrogen container, formed of a heat conductive material, located in thermal contact with the intermediate heat shield, and containing liquid nitrogen to absorb the heat intercepted by the intermediate heat shield through vaporization of the liquid nitrogen; wherein the improvement comprises:

a sub-intermediate heat shield interposed between the second insulation layer and the pressure vessel for intercepting heat that would otherwise be transferred from the intermediate heat shield to the pressure vessel;

a third insulation layer located between the sub-intermediate heat shield and the pressure vessel;

intermediate heat absorption means in thermal contact with the sub-intermediate heat shield and containing a coolant for absorbing the heat intercepted by the sub-intermediate heat shield by undergoing a phase change, the coolant having a phase transition temperature, at which the phase change occurs, below the boiling temperature of liquid nitrogen; and recovery means connected to the intermediate heat absorption means for recovering the coolant after having undergone the phase change for regeneration of the coolant.

2. The cryogenic storage container of claim 1, wherein the coolant comprises neon and the phase change is from liquid to vapor.

3. The cryogenic storage container of claim 2, wherein the recovery means comprises:
- an adsorbant canister,
- an adsorbant located within the adsorbant canister to adsorb the neon after having undergone the phase change from liquid to vapor;
- a relief line connecting the adsorbant canister to the intermediate heat adsorption means for the passage of neon vapor therebetween;
- actuable cooling means for cooling the activated charcoal so that neon vapor is adsorbed by the activated charcoal;
- actuable heating means for heating the activated charcoal so that neon is deadsorbed from the activated charcoal,
- reliquefaction means for reliquefying deadsorbed neon vapor from the adsorbant; and
- control means connected to the actuable cooling and heating means for actuating the cooling means after the neon has undergone the phase change and for actuating the heating means when the neon is to be reliquified.

4. The cryogenic storage container of claim 3, wherein:
- the intermediate heat adsorption means comprises a coolant tank located, within the second layer of insulating material, between the pressure vessel and the liquid nitrogen container, and in thermal contact with the sub-intermediate heat shield; and
- the reliquefaction means comprises a coiled section of the vent line located within the coolant tank so that the liquid cryogen may be recirculated through a liquefaction unit from the vent line and back to the inlet line and thereby cool and reliquefy the vaporized neon.

5. The cryogenic storage container of claim 3, wherein the control means further includes a pressure sensor for sensing the pressure within the adsorbant canister and the control means actuates the cooling and heating means at a predetermined pressure as sensed by the pressure sensor.

6. The cryogenic storage container of claim 3, wherein the adsorbant comprises activated charcoal.

* * * * *